(12) United States Patent
Bi (10) Patent No.: US 7,746,859 B2
(45) Date of Patent: Jun. 29, 2010

(54) METHOD FOR IMPLEMENTING MULTICAST

(75) Inventor: Jianzhong Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 12/094,105

(22) PCT Filed: Oct. 17, 2006

(86) PCT No.: PCT/CN2006/002744

§ 371 (c)(1),
(2), (4) Date: May 16, 2008

(87) PCT Pub. No.: WO2007/056923

PCT Pub. Date: May 24, 2007

(65) Prior Publication Data

US 2008/0291914 A1   Nov. 27, 2008

(30) Foreign Application Priority Data

Nov. 17, 2005   (CN) .................. 2005 1 0123549

(51) Int. Cl.
*H04L 12/28* (2006.01)
(52) U.S. Cl. .................. 370/390; 370/401; 370/432; 709/238
(58) Field of Classification Search .................. None
See application file for complete search history.

(56) References Cited

U.S. PATENT DOCUMENTS

| | | | |
|---|---|---|---|
| 6,181,697 B1 * | 1/2001 | Nurenberg et al. | 370/390 |
| 6,259,701 B1 * | 7/2001 | Shur et al. | 370/401 |
| 6,711,163 B1 | 3/2004 | Reid et al. | |
| 6,718,387 B1 * | 4/2004 | Gupta et al. | 709/226 |
| 6,816,966 B1 * | 11/2004 | Gupta et al. | 713/163 |

(Continued)

FOREIGN PATENT DOCUMENTS

CN   1458771 A   11/2003

(Continued)

OTHER PUBLICATIONS

Christensen et al., "Considerations for IGMP and MLD Snooping Switches," *Internet Engineering Task Force (IETF)*, Network Working Group, Internet Draft (Feb. 2005) http://draft-ietf-magma-snoop-12.txt.

(Continued)

*Primary Examiner*—Bob A Phunkulh
(74) *Attorney, Agent, or Firm*—Leydig, Voit & Mayer, Ltd.

(57) ABSTRACT

A method for implementing multicast in the MAC in MAC network, which method enables the operator's backbone network device to support the multicast copy ability based on the private network user, and allows the public network, which supports the MAC in MAC Layer 2 backbone network, to have the full multicast ability, the inventive method adds into the PBB the correspondence of the multicast address between the private network and the public network as well as the multicast forwarding tables in each network equipments, copies and sends downward the multicast messages stage by stage, so that the multicast messages are sent downward in accordance with the typical multicast tree structure, thereby avoiding the huge waste of the bandwidth due to the multicast copy.

19 Claims, 3 Drawing Sheets

U.S. PATENT DOCUMENTS

| | | | |
|---|---|---|---|
| 6,870,842 B1 * | 3/2005 | Caronni et al. | 370/390 |
| 7,317,722 B2 | 1/2008 | Aquino et al. | |
| 7,522,600 B1 * | 4/2009 | Aggarwal et al. | 370/390 |
| 7,539,205 B1 * | 5/2009 | Deshpande | 370/432 |
| 7,558,219 B1 * | 7/2009 | Aggarwal et al. | 370/256 |
| 7,623,517 B2 | 11/2009 | Suzuki | |

FOREIGN PATENT DOCUMENTS

| | | |
|---|---|---|
| CN | 1595884 A | 3/2005 |
| EP | 1 035 685 A2 | 9/2000 |
| EP | 1 424 806 A1 | 6/2004 |
| GB | 2 405 288 A | 2/2005 |
| KR | 2004-0013520 A | 2/2004 |
| KR | 2004-0047253 A | 6/2004 |

OTHER PUBLICATIONS

Fenner, "Internet Group Management Protocol, Version 2," *Internet Engineering Task Force* (*IETF*), Network Working Group, Request for Comments 2236 (Nov. 1997).

Bottoroff, "IEEE 802.1ah Update," *IEEE*, PowerPoint Presentation (May 2005) http://www.ieee802.org/l/files/public/docs2005/ [retrieved from Internet on Jan. 28, 2010].

English Translation of Written Opinion of the International Searching Authority from International Patent Application No. PCT/CN2006/002744.

* cited by examiner

METHOD FOR IMPLEMENTING MULTICAST

FIELD OF THE INVENTION

The present disclosure relates to Ethernet technologies, and in particular, to a method for implementing multicast in a MAC in MAC network.

BACKGROUND OF THE INVENTION

MAC in MAC, MinM for short, is a technology for provider backbone bridging put forward by IEEE 802.1ah. This technology provides a solution to users' Ethernet service transport in an Ethernet metropolitan area network or a wide area network. It may be compatible with the existing Ethernet metropolitan area networks or wide area network devices, protect the existing backbone bridging devices of the providers and the investment of edge Ethernet access devices of the providers. A network that supports MAC in MAC technology is called MAC in MAC network for short. Ethernet employs MAC in MAC encapsulation mode, so that the security and extensibility of Ethernet may be improved. The public network of MAC in MAC layer 2 backbone network is the management domain of the provider, and it consists of a MinM edge device-provider backbone bridging device (PBB) and a backbone network device (PB). The PBB is used for accessing a service of a user private network via a MinM tunnel, the PB is used for bearing a MinM tunnel.

MinM technology may well resolve the problem of the rapid expansion of MAC address in the provider's Ethernet, and the problem of limitation of service instances in the existing switching (QinQ) access mode, as well as the problems of MAC address multiplexing, user protocol message transparent transmission and remote flow mirroring and the like. QinQ is an Ethernet standard supporting two layers of virtual local area network tags (VLAN TAG) defined by IEEE 802.1ad, which is used by a provider to provide transparent transmission of VLAN.

Ethernet transport service provided by MinM technology is a unicast service based on MAC in MAC tunnel. MinM technology may not provide a good solution to multicast service.

At present, the method for implementing multicast in MinM technology includes copying a multicast message in a custom edge (CE) device by which the multicast source provides a service instance in accordance with the number of the users applying for the service instance in a multicast group, and transporting each copied multicast message to the destination user via its respective MAC in MAC tunnel.

In view of the method for implementing multicast in the existing MinM technology, the point-to-multipoint multicast provided actually transports unicast messages over the backbone network; in other words, multiple copies of multicast messages are transported over the backbone network via different MAC in MAC tunnels respectively, and multicast is processed as unicast in the prior art, and therefore a huge occupation of bandwidth is caused. Moreover, as the proportion of the multicast flow in the network becomes larger and larger, there are more and more multicast sources, and the number of multicast messages copied by each multicast source becomes larger and larger. As a result, more occupation of network bandwidth will be caused when the method of the prior art is employed.

SUMMARY OF THE INVENTION

Therefore, it is an object of the present disclosure to provide a method for implementing multicast, so that a public network, which supports the MAC in MAC Layer 2 backbone network, may have the full multicast ability, and network bandwidth may be saved.

The technical solution of the present disclosure is realized as follows in order to achieve the above object.

A method for implementing multicast, includes:

copying and forwarding a multicast message sent by a multicast source to a user who joins a multicast group stage by stage, according to a corresponding relationship between a private network multicast address and a public network multicast address established in a PBB, a private network multicast forwarding table, a public network multicast forwarding table and a Layer 2 multicast forwarding table of a backbone network established in a PB.

Before the method is performed, a process in which a user joins a multicast group further includes the following steps specifically:

A: sending, by a CE, an IGMP report message for requesting to join a multicast group of a designated service instance via the PBB and the PB in a backbone-virtual local area network (B-VLAN) multicast domain;

B: allocating, by the PBB, public network multicast address, and establishing a corresponding relationship between private network multicast address and the public network multicast address and generating a private network multicast forwarding table for identifying a multicast message out-port, according to the received IGMP report message;

C: transporting, by the PBB, the private network multicast address information to the PB and establishing a Layer 2 multicast forwarding table of the backbone network in the PB; transporting, by the PB, the IGMP report message to a CE providing a multicast service in the designated service instance via the PBB in which the multicast source exists, and establishing a public network multicast forwarding table and a corresponding relationship between the public network multicast address and the private network multicast address in the PBB which the IGMP report message passes through.

The establishing the Layer 2 multicast forwarding table of the backbone network, the corresponding relationship between the public network multicast address and the private network multicast address and the public network multicast forwarding table in step C includes:

C11: converting, by the PBB, the IGMP report message into an IGMP extended report message carrying private network multicast address information, sending the IGMP extended report message to the PBB in which the multicast source exists via the PB in the B-VLAN multicast domain, and generating a Layer 2 multicast forwarding table of a backbone network in each PB through which the IGMP extended report message passes;

C12: generating, by the PBB in which the multicast source exists, a public network multicast forwarding table, resolving the received IGMP extended report message, establishing a corresponding relationship between the public network multicast address and the private network multicast address, converting the received IGMP extended report message into an IGMP report message and sending it to a CE providing multicast service in the designated service instance.

The establishing the Layer 2 multicast forwarding table of the backbone network, the corresponding relationship between the public network multicast address and the private network multicast address and the public network multicast forwarding table in step C includes:

C21: carrying, by the PBB, the private network multicast address information in a preset extended signaling, sending the extended signaling and the IGMP report message to the PBB in which the multicast source exists via a PB in the B-VLAN multicast domain, and generating a Layer 2 multicast forwarding table of a backbone network in each PB through which the IGMP extended report message passes;

C22: generating, by the PBB in which the multicast source exists, a public network multicast forwarding table, establishing a corresponding relationship between the public network multicast address and the private network multicast address according to the extended signaling and the IGMP report message received, and sending the received IGMP report message to a CE providing multicast service in the designated service instance.

The process in which the multicast source issues a multicast message to the user who joins the multicast group specifically includes the following steps:

a: sending, by the CE which provides the multicast service in the designated service instance, a multicast message of the designated multicast group of the service instance to the PBB in which the multicast source exists, and searching, by the PBB in which the multicast source exists, the corresponding relationship between the public network multicast address and the private network multicast address established by itself, replacing the private network multicast address in the received multicast message into the public network multicast address corresponding to the private network multicast address, copying the replaced multicast message according to the public network multicast forwarding table established by itself and forwarding the replaced multicast message to the corresponding PB;

b: copying, by the PB, the received multicast message and forwarding it or forwarding it by the PB to the corresponding PBB, through searching the Layer 2 multicast forwarding table of the backbone network established by itself;

c: searching, by the PBB, the corresponding relationship between the private network multicast address and the public network multicast address established by itself, replacing the public network multicast address in the received multicast message into the private network multicast address corresponding to the public network multicast address, copying the replaced multicast message and forwarding it to the corresponding CE according to the private network multicast forwarding table it has established.

The provider presets a corresponding relationship between the backbone network destination MAC address (B-DA) and the service instance ID (I-SID) and the customer destination MAC address (C-DA) in the PBB, and the method for allocating public network multicast address in step B includes:

allocating, by the PBB, a B-DA corresponding to the C-DA in the corresponding relationship to the IGMP report message according to the C-DA carried in the IGMP report message.

The corresponding relationship between the private network multicast address and the public network multicast address includes: the corresponding relationship between the I-SID and C-DA carried in the IGMP report message and the B-DA; or the corresponding relationship between the I-SID, C-DA and C-SA carried in the IGMP report message and the B-DA.

The corresponding relationship between the private network multicast address and the public network multicast address in step B is established in a private network-public network address mapping table preset in the PBB for identifying the corresponding relationship between the private network multicast address and the public network multicast address.

The converting the IGMP report message into an IGMP extended report message in step C11 includes: adding an extended field into the IGMP report message and converting it into an IGMP extended report message, the extended field being used for carrying the private network multicast address information.

The private network multicast address information in the extended signaling in step C21 includes: I-SID and C-DA; or I-SID, C-DA and C-SA.

The resolving the received IGMP extended report message and establishing the corresponding relationship between the public network multicast address and the private network multicast address in step C12 includes: establishing a corresponding relationship between the B-DA and the private network multicast information according to the B-DA and the private network multicast address information carried in the IGMP extended report message.

The private network multicast address information includes C-DA and I-SID; or C-DA, C-SA and I-SID.

The corresponding relationship between the public network multicast address and the private network multicast address is established in a public network-private network address mapping table preset in the PBB in which the multicast source exists for identifying the corresponding relationship between the public network multicast address and the private network multicast address.

The converting the IGMP extended report message into an IGMP report message in step C12 includes: deleting the extended field in the IGMP extended report message.

The copying and forwarding the replaced multicast message in step a includes:

searching, by the PBB in which the multicast source exists, the out-port corresponding to the replaced public network multicast address in the public network multicast forwarding table established by itself, and forwarding the replaced multicast message to the corresponding PB via the corresponding out-port after copying the replaced multicast message according to the number of the out-ports.

The copying and forwarding the multicast message in step b includes:

searching, by the PB, the out-port corresponding to the replaced public network multicast address carried in the multicast message in the Layer 2 multicast forwarding table of the backbone network established by itself, and forwarding the received multicast message to the PB or the PBB via the corresponding out-port after copying the received multicast message according to the number of the out-ports.

The copying and forwarding the multicast message in step c includes:

searching, by the PBB, the out-port corresponding to the replaced private network multicast address in the private network multicast forwarding table established by itself, and forwarding the replaced multicast message to the corresponding CE via the corresponding out-port after copying the replaced multicast message according to the number of the out-ports.

It may be seen from the above technical solutions that, by the method according to the present disclosure, the provider backbone network device has the ability to support user-based multicast copy, so that the public network that supports MAC in MAC Layer 2 backbone network has the full multicast copy ability. In the method according to the present disclosure, adds into the PBB the corresponding relationship between the private network multicast address and the public network multicast address as well as the multicast forwarding table in each network device; copies and issues the multicast messages stage by stage, so that the multicast messages are issued in accordance with the typical multicast tree structure, thereby avoiding the huge occupation of the bandwidth due to multicast copy.

The present disclosure is compatible with the Core LAN Switch of the existing Ethernet backbone and the multicast control protocol on the Core LAN Switch. At the same time, for the CE on the user side, what it receives is still the existing IGMP report message, and no influence is laid on the existing processing of the CE in the private network on the multicast message. By the method according to the present disclosure, no modification needs to be made on the network structure and the network device, and therefore cost for establishing a network is reduced greatly.

DETAILED DESCRIPTION OF THE EMBODIMENTS

The core concept of the present disclosure lies in that, when a multicast source issues a multicast message to a user who joins a multicast group, it copies and forwards the multicast message sent by the multicast source to the user who joins the multicast group stage by stage, according to a corresponding relationship between the private network multicast address and the public network multicast address established in a PBB, a private network/public network multicast forwarding table and a Layer 2 multicast forwarding table of a backbone network established in a PB.

Before the method according to the present disclosure is performed, a process in which a user joins a multicast group further includes: when a user joins a multicast group, a CE sends an Internet Group Management Protocol (IGMP) report message for requesting to join a multicast group of a designated service instance to a CE in which the multicast source exists via a PBB and a PB in a backbone-virtual local area network (B-VLAN) multicast domain; the PBB allocates public network multicast address, establishes a corresponding relationship between the private network multicast address and the public network multicast address, and generates a private network multicast forwarding table for identifying a multicast message out-port according to the received IGMP report message; the PBB transports the private network multicast address information to the PB and establishes a Layer 2 multicast forwarding table of the backbone network in the PB; the PB transports the IGMP report message to a CE providing multicast service in the designated service instance via the PBB in which the multicast source exists, and establishes a corresponding relationship between the public network multicast address and the private network multicast address and a public network multicast forwarding table in the PBB which the IGMP report message passes through.

To make the objects, technical solutions and advantages of the present disclosure more apparent, the present disclosure is described in detail in conjunction with the accompanying drawings and exemplary embodiments.

Figure 1:
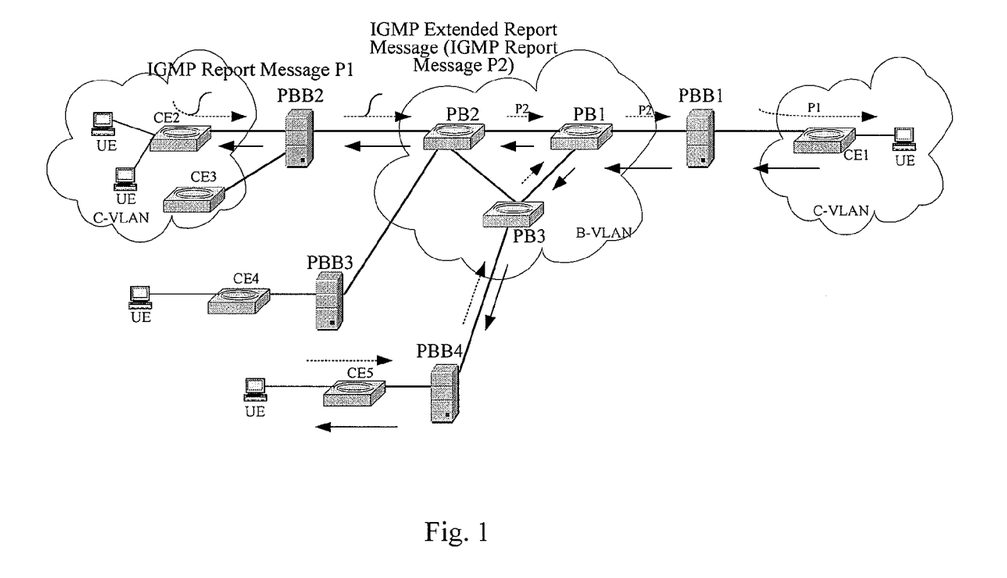
FIG. 1 is a schematic diagram showing the flow direction of a message for implementing multicast in a MAC in MAC network according to the present disclosure.

FIG. 1 is a schematic diagram showing the flow direction of a message for implementing multicast in a MAC in MAC network according to the present disclosure. The networking structure shown in FIG. 1 is the structure of the prior art; and for its details, reference may be made to related documents. FIG. 1 mainly includes two parts, that is, a public network and a private network which are connected to each other via a PBB. The PBB is connected with a user equipment (UE) via a CE; for example, PBB2 is connected with two UEs via CE2, and the PBB accesses the public network via the PB. Different customer-virtual local area networks (C-VLAN) may be divided according to practical requirements. Similarly, the public networks may be divided into different B-VLANs according to practical situations.

In FIG. 1, the dash-line arrow represents the flow direction of the message by which a user requests to join a multicast group of a designated service instance, and the solid-line arrow represents the message flow direction of the multicast message issued by the multicast source to the user who joins the multicast group of a designated service instance. It is assumed that in FIG. 1, the multicast source is the service instance provided by CE1, and CE2 and CE5 belong to a multicast group that request to join the service instance provided by CE1 so as to obtain the multicast message of the multicast group. The message flow direction is as shown in FIG. 1. The method for applying to join a multicast group in multicast and the method for a multicast source to issue a multicast message to a user who joins a multicast group according to the present disclosure will be described in conjunction with FIG. 2 and FIG. 3 respectively.

Figure 2:
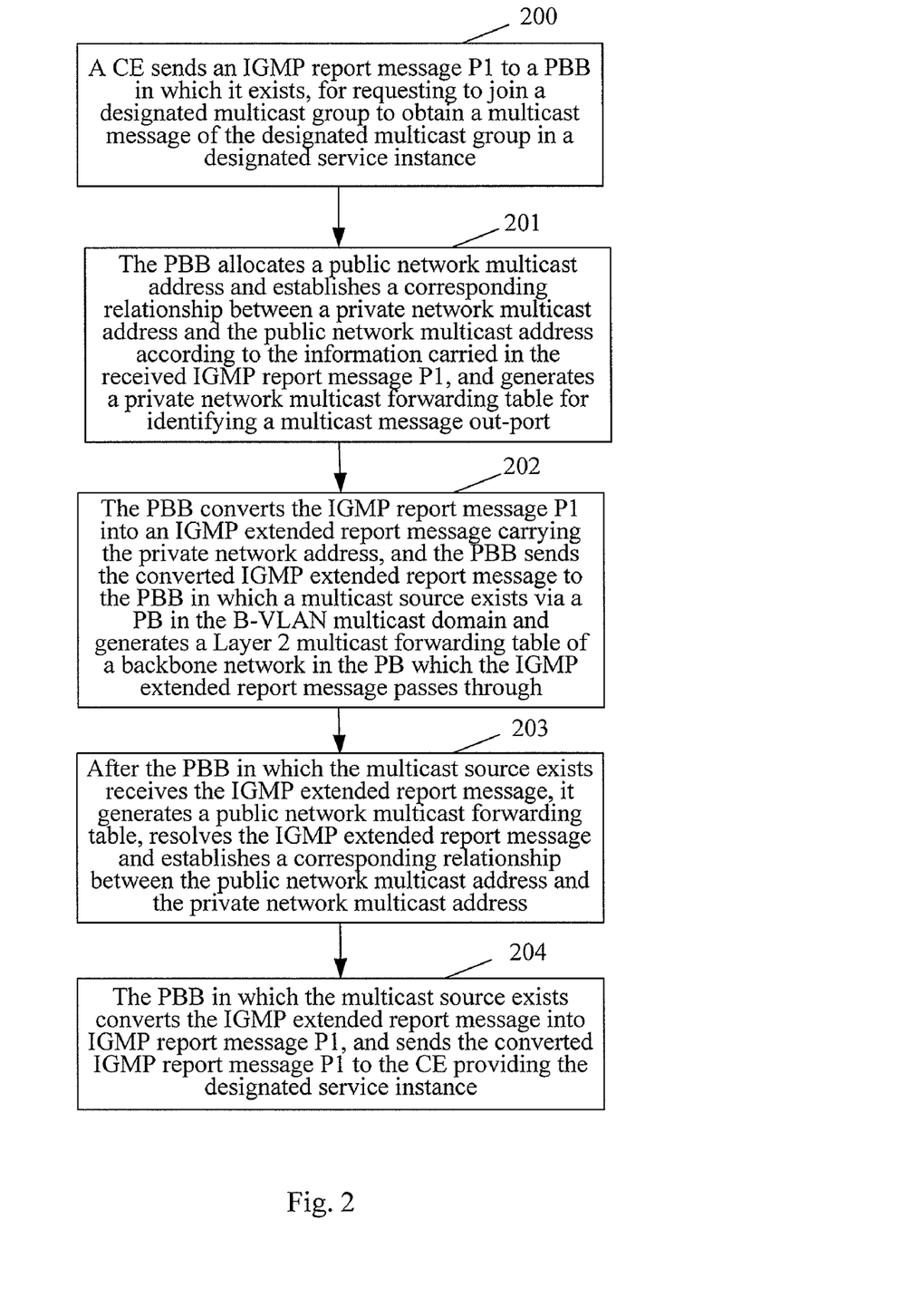
FIG. 2 is a flow chart of the process for applying to join a multicast group during the process for implementing multicast according to one embodiment of the present disclosure.

FIG. 2 is a flow chart of the process for applying to join a multicast group during the process for implementing multicast according to one embodiment of the present disclosure. For example, in the case that CE2 requests to join the multicast group in which the service instance provided by CE1 exists to obtain the multicast message, the method includes the following steps:

Step 200: CE2 sends an IGMP report message P1 to PBB2 in which the CE2 exists.

The IGMP report message is used for applying to join the multicast group of a designated service instance to obtain the multicast message of the multicast group. The IGMP report message mainly carries the address of the private network multicast group that requests to be joined in (that is, C-DA) and the customer source MAC address (C-SA) and the like.

Step 201: PBB2 in which the CE2 exists allocates public network multicast address and establishes a corresponding relationship between the private network multicast address and the public network multicast address according to the information carried in the received IGMP report message P1, and generates a private network multicast forwarding table for identifying a multicast message out-port.

In terms of the corresponding relationship between the B-DA and the couple of the service instance ID (I-SID) and the C-DA preset by the provider, and according to the C-DA in the IGMP report message, PBB2 allocates a B-DA corresponding to the I-SID and C-DA to an IGMP report message from CE2.

According to the allocated B-DA, PBB2 establishes a corresponding relationship between the I-SID, C-DA and C-SA of the IGMP report message P1 and the B-DA. Specifically, a private network-public network address mapping table for identifying the corresponding relationship between the private network multicast address and the public network multicast address may be preset in PBB2. In this step, the corresponding relationship established is added into the private network-public network address mapping table as a record.

A private network multicast forwarding table is generated according to IGMP snooping method that supports common Layer 2 Ethernet multicast, and an out-port of the multicast message on PBB2 is provided. Different out-ports correspond to different CEs. Specifically, reference may be made to related protocols, and is not described again here.

Step 202: PBB2 converts the received IGMP report message P1 into an IGMP extended report message (IGMP-Report-Ext), that is, IGMP report message P2, which carries the private network multicast address, and PBB2 sends IGMP report message P2 to PBB1 in which the multicast source exists via the PB in the B-VLAN multicast domain and generates a Layer 2 multicast forwarding table of the backbone network in the PB through which the IGMP extended report message P2 passes.

The destination address of IGMP report message P2 is the B-DA allocated in Step 201. The conversion from IGMP report message P1 to IGMP report message P2 may be realized by adding an extended field in IGMP report message P1. The extended field is used for carrying a private network multicast address such as C-DA, C-SA and I-SID. C-SA is optional.

Additionally, PBB2 may also notify the PB in the multicast domain in which it exists of the private network multicast address information such as C-DA, C-SA and I-SID via an independent customized extended signaling. C-SA is optional. At this time, IGMP report message P1 is sent directly instead of being converted.

In this embodiment, it is assumed that the private network multicast address is transported by the method for converting an IGMP report message into an IGMP extended report message.

In the PB through which the B-VLAN multicast domain passes, a Layer 2 multicast forwarding table of a backbone network is generated according to the IGMP snooping method that supports common Layer 2 Ethernet multicast, an out-port of the multicast message on the PB is provided. Different out-ports correspond to different PBB. Specifically, reference may be made to related protocols, and is not described again here. In this embodiment, in conjunction with FIG. 1, respective Layer 2 multicast forwarding table of a backbone network needs to be established in PB2 and PB1 respectively.

Step 203: After receiving IGMP report message P2, PBB1 generates a public network multicast forwarding table, resolves the IGMP report message P2 received and establishes a corresponding relationship between the public network multicast address and the private network multicast address.

A public network multicast forwarding table is generated according to the IGMP snooping method that supports common Layer 2 Ethernet multicast, and an out-port of the multicast message on PBB1 is provided. Different out-ports correspond to different PBs. Specifically, reference may be made to related protocols, and is not described again here.

A corresponding relationship between the B-DA and the private network multicast address in the extended field such as I-SID, C-DA and C-SA is established according to the B-DA and the extended field carried in IGMP report message P2. The C-SA is optional. Specifically, a public network-private network address mapping table for identifying the corresponding relationship between the public network multicast address and the private network multicast address may be preset in PBB1. In this step, the corresponding relationship, which has been established, between the B-DA and the private network multicast address information is added into the public network-private network address mapping table as a record.

Step 204: PBB1 converts the received IGMP report message P2 into IGMP report message P1, and sends the converted IGMP report message P1 to CE1 providing multicast service in the designated service instance.

The method for converting IGMP report message P2 into IGMP report message P1 includes: deleting the extended field added into IGMP report message P2 and recovering to the form of IGMP report message P1 sent from CE2; then, sending the IGMP report message to the CE1 corresponding to the service instance.

It should be noted that, if the PB in the multicast domain is notified of the private network multicast address information such as C-DA, C-SA and I-SID by means of an independent customized extended signaling. C-SA is optional. Then in Step 203, PBB1 performs the subsequent processes according to the IGMP report message P1 and the extended signaling received, while in Step 204, PBB1 only sends the received IGMP report message to CE1 that provides the designated service instance according to the extended signaling, and the converting process will be omitted.

In view of the above method for applying to join a multicast group in multicast according to the present disclosure, by adding a corresponding relationship between private network multicast address and public network multicast address in a PBB and by the multicast forwarding tables in the PBB and the PB, the issuing destination and the out-port of the multicast message are found, thereby making preparation for issuing of the multicast message.

Figure 3:
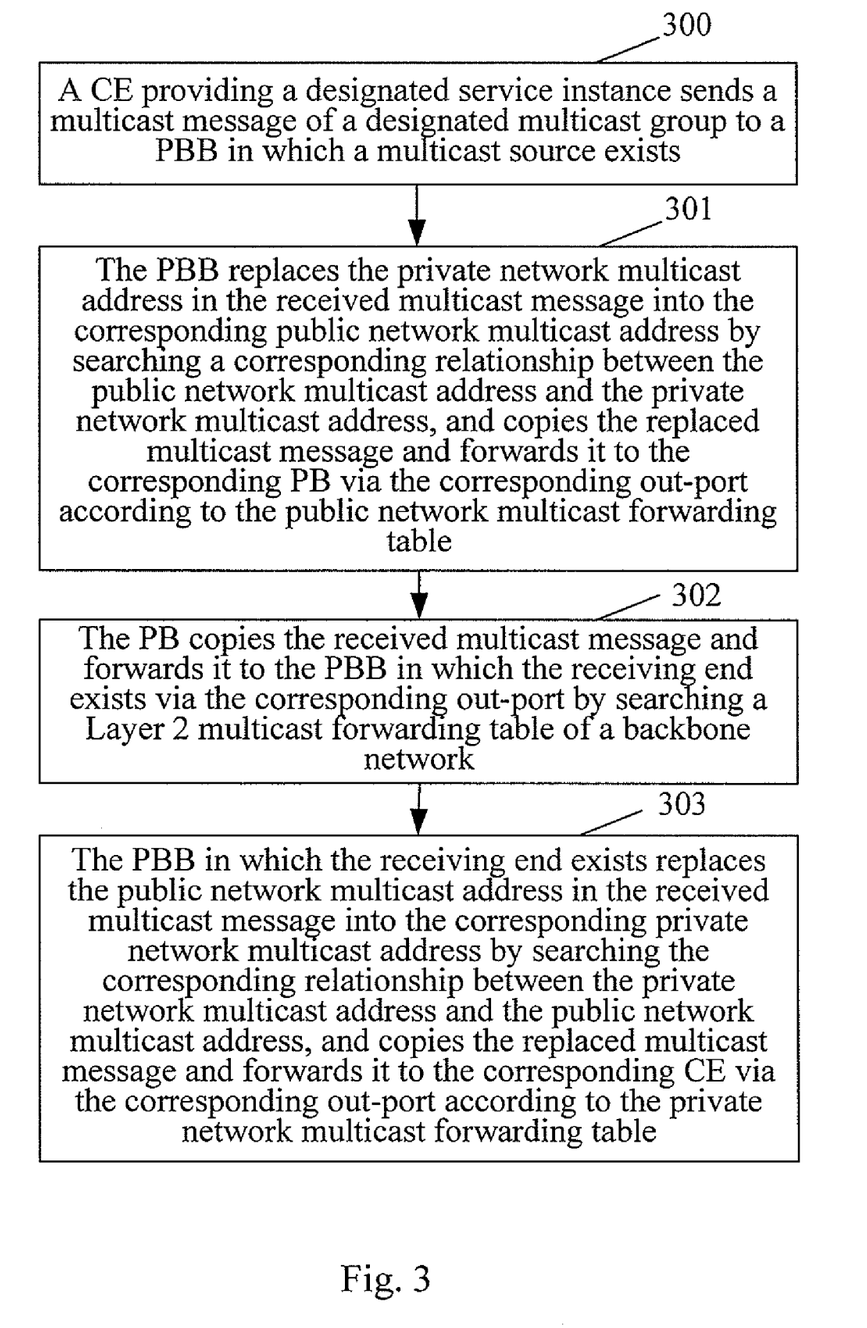
FIG. 3 is a flow chart of the process for issuing a multicast message during the process for implementing multicast according to one embodiment of the present disclosure.

FIG. 3 is a flow chart of the process for issuing a multicast message during the process for implementing multicast according to one embodiment of the present disclosure. It is assumed that CE1 provides a multicast message in the service instance, CE2 and CE5 are custom edge devices in the same service instance as that of CE1, and CE2 and CE5 apply for a multicast service from CE1. The method for issuing a multicast message includes the following steps.

Step 300-Step 301: CE1 sends a multicast message of a designated multicast group of the designated service instance to PBB1 in which the multicast source exists; PBB1 replaces the private network multicast address in the received multicast message into the corresponding public network multicast address according to the corresponding relationship between the public network multicast address and the private network multicast address stored therein, and copies the replaced multicast message and forwards it to the corresponding PB via the corresponding out-port according to the public network multicast forwarding table stored in PBB1.

In this step, a private network multicast message is converted into a public network multicast message by replacing the destination multicast address of the private network into the multicast address of the public network.

In PBB1, a corresponding relationship between B-DA and I-SID, C-DA, C-SA is established. It is assumed that this corresponding relationship is an address mapping item in the public network-private network address mapping table. PBB1 matches the I-SID, C-DA and C-SA in the multicast message with the address mapping item in the public network-private network address mapping table and replaces the private network multicast address, that is, C-DA, in the multicast message with the B-DA corresponding to the address mapping item matched.

PBB1 searches the out-port of the corresponding B-DA in the public network multicast forwarding table, and forwards the replaced copied multicast message to the corresponding PB via the corresponding out-port after copying the replaced multicast message according to the number of the out-ports.

Step 302: After receiving the multicast message, the PB searches the Layer 2 multicast forwarding table of the backbone network established by itself according to the B-DA in the multicast message, searches the out-port of the corresponding B-DA, and forwards the received multicast message to the corresponding PB or PBB via the corresponding out-port after copying the received multicast message according to the number of the out-ports.

In conjunction with FIG. 1, CE2 and CE5 in this embodiment both belong to the multicast group of the service instance provided by CE1. Therefore, after receiving a multicast message from PBB1, PB1 duplicates the multicast message in two copies, in which one copy is forwarded to PBB2 via PB2, and the other copy is forwarded to PBB4 via PB3.

Step 303: The PBB in which the receiving end exists replaces the public network multicast address in the received multicast message into the corresponding private network multicast address according to the corresponding relationship between the private network multicast address and the public network multicast address stored therein, and copies the replaced multicast message and forwards it to the corresponding CE via the corresponding out-port according to the private network multicast forwarding table stored in the PBB in which the receiving end exists.

A corresponding relationship between the I-SID, C-DA, C-SA and the B-DA is established in the PBB in which the receiving end exists. It is assumed that the corresponding relationship is an address mapping item in the private network-public network address mapping table. The PBB in which the receiving end exists matches the B-DA in the multicast message with the address mapping item in the public network-private network address mapping table, and replaces the B-DA in the multicast message with the C-DA corresponding to the address mapping item matched.

The PBB in which the receiving end exists searches the out-port corresponding to the private network multicast address C-SA in the private network multicast forwarding table of the designated service instance, and forwards the received multicast message to the corresponding CE via the corresponding out-port after copying the received multicast message according to the number of the out-ports.

In this embodiment, PBB3 forwards the received multicast message to CE5, and PBB2 forwards the received multicast message to CE2.

After Step 303, a multicast mechanism independently controlled by the user in the private network copies and forwards the multicast message. Specifically, the implementing process is consistent with the prior art, and reference may be made to related documents and is not described again here.

Additional advantages and modifications will readily occur to those skilled in the art. Therefore, the present disclosure in its broader aspects is not limited to the specific details and representative embodiments shown and described herein. Accordingly, various modifications and variations may be made without departing from the spirit or scope of the present disclosure as defined by the appended claims and their equivalents.

What is claimed is:

1. A method for implementing multicast, comprising:
    copying and forwarding a multicast message sent by a multicast source to a user who joins a multicast group stage by stage according to a corresponding relationship between a private network multicast address and a public network multicast address established in a provider backbone bridging device (PBB), a private network multicast forwarding table, a public network multicast forwarding table and a Layer 2 multicast forwarding table of a backbone network established in a backbone network device (PB) in a backbone-virtual local area network (B-VLAN) multicast domain,
    wherein before copying and forwarding the multicast message, a user joins the multicast group by:
    A: sending, by a custom edge device (CE), an Internet Group Management Protocol (IGMP) report message for requesting to join a multicast group of a designated service instance to the CE in which the multicast source exists via the PBB and the PB;
    B: allocating, by the PBB, a public network multicast address, establishing the corresponding relationship between a private network multicast address and the public network multicast address, and generating a private network multicast forwarding table for identifying the multicast message out-port, according to the received IGMP report message; and
    C: transporting, by the PBB, private network multicast address information to the PB, and establishing the Layer 2 multicast forwarding table of the backbone network in the PB; transporting, by the PB, the IGMP report message to the CE providing multicast service in the designated service instance via the PBB in which the multicast source exists, and establishing the corresponding relationship between the public network multicast address and the private network multicast address and the public network multicast forwarding table in the PBB which the IGMP report message passes through.

2. The method according to claim 1, wherein, the establishing the Layer 2 multicast forwarding table of the backbone network, the corresponding relationship between the public network multicast address and the private network multicast address and the public network multicast forwarding table in step C comprises:
    C11: converting, by the PBB, the IGMP report message into an IGMP extended report message carrying the private network multicast address information, sending the IGMP extended report message to the PBB in which the multicast source exists via a PB in a B-VLAN multicast domain, and generating the Layer 2 multicast forwarding table of the backbone network in each PB through which the IGMP extended report message passes;
    C12: generating, by the PBB in which the multicast source exists, the public network multicast forwarding table, resolving the received IGMP extended report message, establishing the corresponding relationship between the public network multicast address and the private network multicast address, converting the received IGMP extended report message into an IGMP report message and sending the IGMP report message to the CE providing multicast service in the designated service instance.

3. The method according to claim 2, wherein, the converting the IGMP report message into an IGMP extended report message in step C11 comprises: adding an extended field into the IGMP report message and converting it into an IGMP extended report message, and the extended field is used for carrying the private network multicast address information.

4. The method according to claim 3, wherein, the private network multicast address information comprises C-DA and I-SID; or C-DA, C-SA and I-SID.

5. The method according to claim 2, wherein, the resolving the received IGMP extended report message and establishing the corresponding relationship between the public network multicast address and the private network multicast address in step C12 comprises: establishing the corresponding relationship between the B-DA and the private network multicast information according to the B-DA and the private network multicast address information carried in the IGMP extended report message.

6. The method according to claim 5, wherein, the private network multicast address information comprises C-DA and I-SID; or C-DA, C-SA and I-SID.

7. The method according to claim 2, wherein, the corresponding relationship between the public network multicast address and the private network multicast address is established in a public network-private network address mapping table preset in the PBB in which the multicast source exists for identifying the corresponding relationship between the public network multicast address and the private network multicast address.

8. The method according to claim 2, wherein, the converting the IGMP extended report message into an IGMP report message in step C12 comprises: deleting the extended field in the IGMP extended report message.

9. The method according to claim 1, wherein, the establishing the Layer 2 multicast forwarding table of the backbone network, the corresponding relationship between the public network multicast address and the private network multicast address and the public network multicast forwarding table in step C comprises:
C21: carrying, by the PBB, the private network multicast address information in a preset extended signaling, sending the extended signaling and the IGMP report message to the PBB in which the multicast source exists via a PB in the B-VLAN multicast domain, and generating the Layer 2 multicast forwarding table of the backbone network in each PB through which the IGMP extended report message passes;
C22: generating, by the PBB in which the multicast source exists, a public network multicast forwarding table, establishing the corresponding relationship between the public network multicast address and the private network multicast address according to the extended signaling and the IGMP report message received, and sending the received IGMP report message to the CE providing multicast service in the designated service instance.

10. The method according to claim 9, wherein, the private network multicast address information in the extended signaling in step C21 comprises: I-SID and C-DA; or I-SID, C-DA and C-SA.

11. The method according to claim 9, wherein, the corresponding relationship between the public network multicast address and the private network multicast address is established in a public network-private network address mapping table preset in the PBB in which the multicast source exists for identifying the corresponding relationship between the public network multicast address and the private network multicast address.

12. The method according to claim 1, wherein, the process in which the multicast source issues the multicast message to the user who joins the multicast group specifically comprises:

a: sending, by the CE providing multicast service in a designated service instance, the multicast message of the designated multicast group of the service instance to the PBB in which the multicast source exists; searching, by the PBB in which the multicast source exists, the corresponding relationship between the public network multicast address and the private network multicast address established by itself; replacing the private network multicast address in the received multicast message into the public network multicast address corresponding to the private network multicast address; copying the replaced multicast message according to the public network multicast forwarding table established by itself and forwarding the replaced multicast message to the corresponding PB;

b. copying, by the PB, the received multicast message and forwarding it or forwarding it by the PB to the corresponding PBB, through searching the Layer 2 multicast forwarding table of the backbone network established by itself; and c: searching, by the PBB, the corresponding relationship between the private network multicast address and the public network multicast address established by itself, replacing the public network multicast address in the received multicast message into the private network multicast address corresponding to the public network multicast address, copying the replaced multicast message and forwarding it to the corresponding CE according to the private network multicast forwarding table established by itself.

13. The method according to claim 12, wherein, the copying and forwarding the replaced multicast message in step a comprises:
searching, by the PBB in which the multicast source exists, the out-port corresponding to the replaced public network multicast address in the public network multicast forwarding table established by itself, and forwarding the replaced multicast message to the corresponding PB via the corresponding out-port after copying the replaced multicast message according to the number of the out-ports.

14. The method according to claim 12, wherein, the copying and forwarding the multicast message in step b comprises:
searching, by the PB, the out-port corresponding to the public network multicast address carried in the multicast message in the Layer 2 multicast forwarding table of the backbone network established by itself, and forwarding the received multicast message to the PB or the PBB via the corresponding out-port after copying the received multicast message according to the number of the out-ports.

15. The method according to claim 12, wherein, the copying and forwarding the multicast message in step c comprises:
searching, by the PBB, the out-port corresponding to the replaced private network multicast address in the private network multicast forwarding table established by itself, and forwarding the replaced multicast message to the corresponding CE via the corresponding out-port after copying the replaced multicast message according to the number of the out-ports.

16. The method according to claim 1, wherein, the provider presets the corresponding relationship between a backbone network destination MAC address (B-DA) and a service instance ID (I-SID) and a customer destination MAC address (C-DA) in the PBB, and the method for allocating public network multicast address in step B comprises:

allocating, by the PBB, a B-DA corresponding to the C-DA in the corresponding relationship to the IGMP report message according to the C-DA carried in the IGMP report message;

the corresponding relationship between the private network multicast address and the public network multicast address comprising: a corresponding relationship between the I-SID and C-DA carried in the IGMP report message and the B-DA; or a corresponding relationship between the I-SID, C-DA and C-SA carried in the IGMP report message and the B-DA.

17. The method according to claim 1, wherein, the corresponding relationship between the private network multicast address and the public network multicast address in step B is established in a private network-public network address mapping table preset in the PBB for identifying the corresponding relationship between the private network multicast address and the public network multicast address.

18. A method for implementing multicast, comprising:

copying and forwarding a multicast message sent by a multicast source to a user who joins a multicast group stage by stage according to a corresponding relationship between a private network multicast address and a public network multicast address established in a provider backbone bridging device (PBB), a private network multicast forwarding table, a public network multicast forwarding table and a Layer 2 multicast forwarding table of a backbone network established in a backbone network device (PB) in a backbone-virtual local area network (B-VLAN) multicast domain, wherein the process in which the multicast source issues the multicast message to the user who joins the multicast group specifically comprises:

a: sending, by the CE providing multicast service in a designated service instance, the multicast message of the designated multicast group of the service instance to the PBB in which the multicast source exists; searching, by the PBB in which the multicast source exists, the corresponding relationship between the public network multicast address and the private network multicast address established by itself; replacing the private network multicast address in the received multicast message into the public network multicast address corresponding to the private network multicast address; copying the replaced multicast message according to the public network multicast forwarding table established by itself and forwarding the replaced multicast message to the corresponding PB;

b. copying, by the PB, the received multicast message and forwarding it or forwarding it by the PB to the corresponding PBB, through searching the Layer 2 multicast forwarding table of the backbone network established by itself; and c: searching, by the PBB, the corresponding relationship between the private network multicast address and the public network multicast address established by itself, replacing the public network multicast address in the received multicast message into the private network multicast address corresponding to the public network multicast address, copying the replaced multicast message and forwarding it to the corresponding CE according to the private network multicast forwarding table established by itself.

19. A system for implementing multicast, comprising a Provider Backbone Bridging device (PBB), a custom edge device (CE); and a backbone network device (PB), wherein:

the PBB is configured to copy and forward a multicast message sent by a multicast source to a user who joins a multicast group stage by stage according to a corresponding relationship between a private network multicast address and a public network multicast address established in the PBB, a private network multicast forwarding table, a public network multicast forwarding table and a Layer 2 multicast forwarding table of a backbone network established in the PB in a backbone-virtual local area network (B-VLAN) multicast domain, and wherein the CE is configured to send an Internet Group Management Protocol (IGMP) report message for requesting to join a multicast group of a designated service instance to a CE in which the multicast source exists via the PBB and the PB, and the PBB is further configured to allocate a public network multicast address, establish the corresponding relationship between a private network multicast address and the public network multicast address, and generate a private network multicast forwarding table for identifying the multicast message out-port, according to the received IGMP report message; and transport private network multicast address information to the PB, and establish the Layer 2 multicast forwarding table of the backbone network in the PB; and the PB is configured to transport the IGMP report message to the CE providing multicast service in the designated service instance via the PBB in which the multicast source exists, and establish the corresponding relationship between the public network multicast address and the private network multicast address and the public network multicast forwarding table in the PBB which the IGMP report message passes through.

* * * * *